(12) United States Patent
Iliev

(10) Patent No.: US 10,052,843 B1
(45) Date of Patent: Aug. 21, 2018

(54) MATERIAL FOR THE MANUFACTURE FOR BALLISTIC SHIELDING

(71) Applicant: Shot Stop Ballistics LLC, Stow, OH (US)

(72) Inventor: Vall A. Iliev, Stow, OH (US)

(*) Notice: Subject to any disclaimer, the term of this patent is extended or adjusted under 35 U.S.C. 154(b) by 0 days.

(21) Appl. No.: 15/335,230

(22) Filed: Oct. 26, 2016

Related U.S. Application Data

(63) Continuation-in-part of application No. 13/219,920, filed on Aug. 29, 2011, now Pat. No. 9,180,623, and a continuation-in-part of application No. 14/701,326, filed on Apr. 30, 2015, now Pat. No. 9,944,041, which is a continuation-in-part of application No. 13/219,920, filed on Aug. 29, 2011, now Pat. No. 9,180,623.

(51) Int. Cl.
| | |
|---|---|
| B23K 37/00 | (2006.01) |
| B32B 5/12 | (2006.01) |
| B32B 27/12 | (2006.01) |
| B32B 27/32 | (2006.01) |
| B32B 38/00 | (2006.01) |
| B29C 71/00 | (2006.01) |
| F41H 5/04 | (2006.01) |
| B29L 31/00 | (2006.01) |

(52) U.S. Cl.
CPC ............ B32B 5/12 (2013.01); B29C 71/0072 (2013.01); B32B 27/12 (2013.01); B32B 27/32 (2013.01); B32B 38/0012 (2013.01); B32B 38/0036 (2013.01); F41H 5/0478 (2013.01); B29K 2023/06 (2013.01); B29K 2995/0089 (2013.01); B29L 2031/768 (2013.01); B32B 2255/02 (2013.01); B32B 2255/10 (2013.01); B32B 2262/106 (2013.01); B32B 2307/208 (2013.01); B32B 2307/3065 (2013.01); B32B 2307/558 (2013.01); B32B 2313/04 (2013.01); B32B 2323/04 (2013.01); B32B 2571/02 (2013.01)

(58) Field of Classification Search
CPC ........................................................ B32B 5/12
USPC ........................................................ 428/105
See application file for complete search history.

(56) References Cited

U.S. PATENT DOCUMENTS

| | | |
|---|---|---|
| 4,403,012 A | 9/1983 | Harpell et al. |
| 4,457,985 A | 7/1984 | Harpell et al. |
| 4,613,535 A | 9/1986 | Harpell et al. |
| 4,623,574 A | 11/1986 | Harpell et al. |

(Continued)

OTHER PUBLICATIONS

U.S. Appl. No. 61/436,423, filed Jan. 26, 2011, Wong et al.

*Primary Examiner* — Brent T O'Hern
(74) *Attorney, Agent, or Firm* — John D Gugliotta

(57) ABSTRACT

A ballistic shielding material element is provided formed of molecularly oriented layers of material, such a polyethylene or HDPE that is modified using the application of continuous mechanical tension in combination with alternating heating and cooling cycles. The molecularly oriented planar material may then be used in the creation of ballistic resistant material panels through bias lay-up of subsequent layers. Further, the final multilayer composite may be additionally cured to form a final shape, such as a sheet material for construction or three dimensional shapes such as helmets, shields or custom shapes as needed by the end user. The instant abstract is neither intended to define the invention disclosed in this specification nor intended to limit the scope of the invention in any way.

27 Claims, 7 Drawing Sheets

(56) References Cited

U.S. PATENT DOCUMENTS

| | | | |
|---|---|---|---|
| 4,650,710 A | 3/1987 | Harpell et al. | |
| 4,737,402 A | 4/1988 | Harpell et al. | |
| 4,748,064 A | 5/1988 | Harpell et al. | |
| 5,552,208 A | 9/1996 | Lin et al. | |
| 5,587,230 A | 12/1996 | Lin et al. | |
| 6,642,159 B1 | 11/2003 | Bhatnagar et al. | |
| 6,841,492 B2 | 1/2005 | Bhatnagar et al. | |
| 6,846,758 B2 | 1/2005 | Bhatnagar et al. | |
| 7,762,175 B1 | 7/2010 | Bhatnagar et al. | |
| 2011/0174145 A1* | 7/2011 | Ogrin | C04B 35/053 89/36.02 |
| 2012/0189795 A1* | 7/2012 | Wong | D01D 5/0069 428/36.91 |

* cited by examiner

MATERIAL FOR THE MANUFACTURE FOR BALLISTIC SHIELDING

RELATED APPLICATIONS

The present invention is a Continuation in Part application of U.S. Ser. No. 14/701,326, filed on Apr. 30, 2015 and now U.S. Pat. No. 9,944,041. The present invention and that disclosed in U.S. Ser. No. 14/701,326 are both a continuation in part of U.S. Ser. No. 13/219,920, filed on Aug. 29, 2011 and now U.S. Pat. No. 9,180,623. Each related application is incorporated by reference as if fully rewritten herein.

BACKGROUND OF THE INVENTION

1. Field of the Invention

This invention relates to a composite material that may be formed into panels having superior ballistic resistant properties and, more particularly, to a resulting composite ballistic material having a very low cost-weight ratio, and a very low cost-strength ratio and without using fiber as the reinforcement.

2. Description of the Related Art

Ballistic resistant articles containing high [tensile] strength fibers that have excellent properties against projectiles are well known. High strength fibers conventionally used include polyolefin fibers, such as extended chain polyethylene fibers; and aramid fibers, such as para- and meta-aramid fibers. For many applications, the fibers may be used in a woven or knitted fabric. For other applications, the fibers may be encapsulated or embedded in a matrix material to form non-woven, rigid or flexible fabrics.

Various ballistic resistant constructions are known that are useful for the formation of hard or soft armor articles such as helmets, structural panels and ballistic resistant vests. For example, U.S. Pat. No. 4,403,012, U.S. Pat. No. 4,457,985, U.S. Pat. No. 4,613,535, U.S. Pat. No. 4,623,574, U.S. Pat. No. 4,650,710, U.S. Pat. No. 4,737,402, U.S. Pat. No. 4,748,064, U.S. Pat. No. 5,552,208, U.S. Pat. No. 5,587,230, U.S. Pat. No. 6,642,159, U.S. Pat. No. 6,841,492, U.S. Pat. No. 6,846,758, and U.S. Pat. No. 7,762,175, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an im pact resistant rigid composite having a plurality of fibrous layers which comprise a network of filaments disposed in a highly rigid matrix, with elastomeric layers there between. The composite is bonded to a hard plate to increase protection against armor piercing projectiles.

All of these known references involve the use of fibers to build the composites, in the form of a roving, ply, or yarn. However, it has been found that the use of fibers, per se, is not necessary to achieve superior ballistic resistance in a finished product.

Consequently, a need has been felt for providing improved composite material having superior ballistic resistant properties while having no requirement for using fiber as the reinforcement.

SUMMARY OF THE INVENTION

It is therefore an object of the present invention to provide a composite ballistic shielding material with a very low cost-weight ratio, and a very low cost-strength ratio.

It is a feature of the present invention to provide a composite shop rolled sheet material capable of being manufactured into panels having superior ballistic resistant properties.

In a preferred aspect of the present invention, an otherwise amorphous plastic such as high density polyethylene ("HDPE") having an unaligned, non-crystalline molecular structure is modified such as to result in a planar sheet material having a targeted molecular alignment. By mechanically modifying the HDPE, the alignment of the fibers creates an anisotropic material that can be further utilized as molecularly oriented thin planar sheets to replace or supplement the use of fibers in the manufacture of ballistic shielding as described in the Related Art, above.

The use of molecularly oriented planar sheets of material can provide decreased lay up time, as opposed to the layering of oriented fibers. Such materials, and their methods of manufacture, allows the composite to achieve ballistic resistance at a much lower cost-to-strength ratio than with traditional ballistic composites typically found on the market.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Referring now to FIG. 1-4, variations of textured planar material 10 or flat planar material 30 are shown that are formed of strand or ribbon oriented strips 20, 40 of polyethylene as shown, taught and described in the Related Art, and especially as shown in U.S. Pat. No. 9,180,623, incorporated by reference as if rewritten herein in its entirety. As shown generally in the related art, the use of PE or HDPE in the production of composite materials capable of being used to create anti-ballistic devices is taught through the use of blending with carbon nanotube or other additives, orienting the materials into aligned strips 20, 40 to create oriented plies of materials, and then layering numerous plies 10, 20 at an bias to one another while building a desired thickness "T" of material. Such processing transforms relatively inexpensive, common plastic materials into composite panels that both have anti-ballistic properties, as well as can be further formed into three dimensional shaped products such as helmets, shields or custom shapes as needed by the end user.

Figure 1:
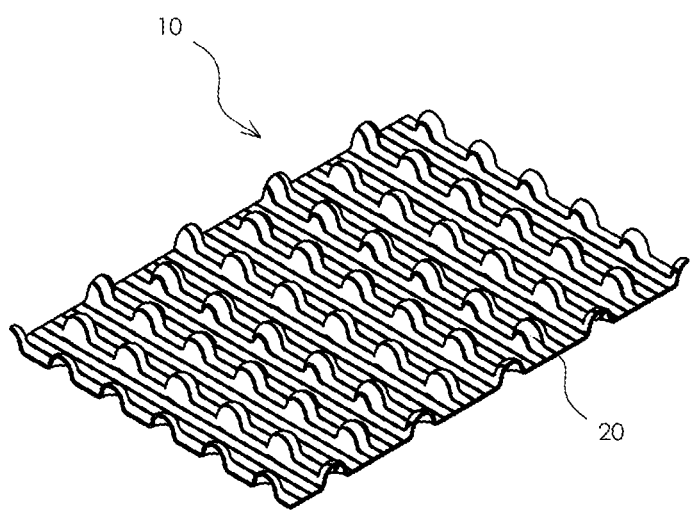
FIG. 1 is a perspective view of a planar sheet of material comprised of shaped-ribbon bias plies formed according to the preferred embodiment of the present invention as disclosed and taught in the Related Art.
Figure 2:
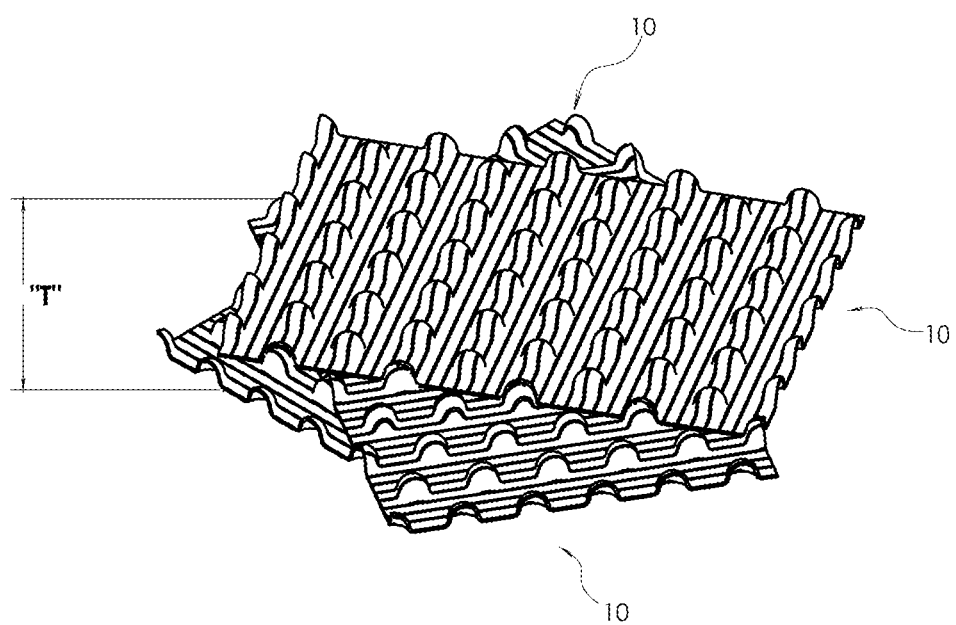
FIG. 2 is a perspective view of a lay-up of three shaped-ribbon bias plies of the type shown in FIG. 1.
Figure 3:
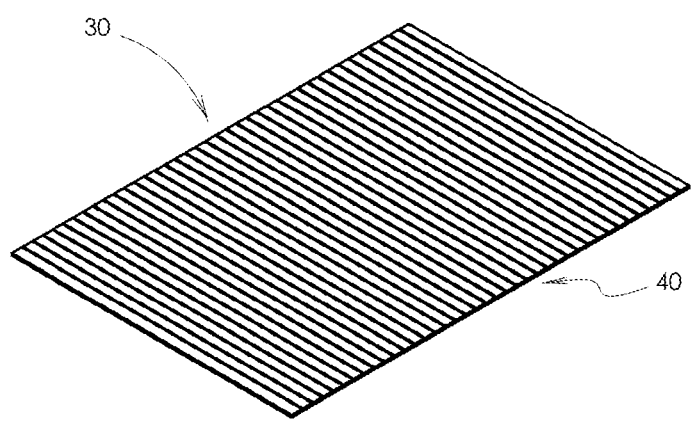
FIG. 3 is a perspective view of a planar sheet of material comprised of an alternate orientation of flat-ribbon bias plies formed according to the preferred embodiment of the present invention as disclosed and taught in the Related Art.
Figure 4:
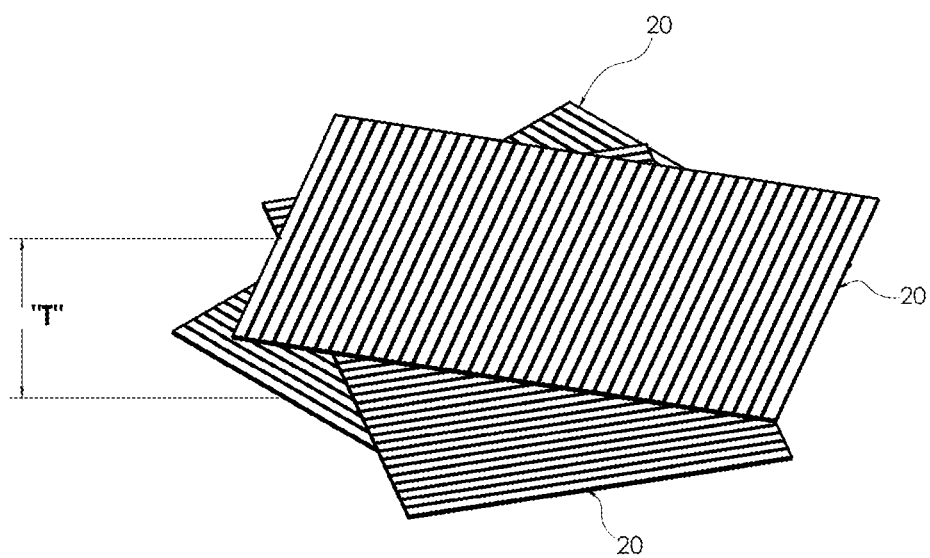
FIG. 4 is a perspective view of a lay-up of three flat-ribbon bias plies of the type shown in FIG. 3.
Figure 5:
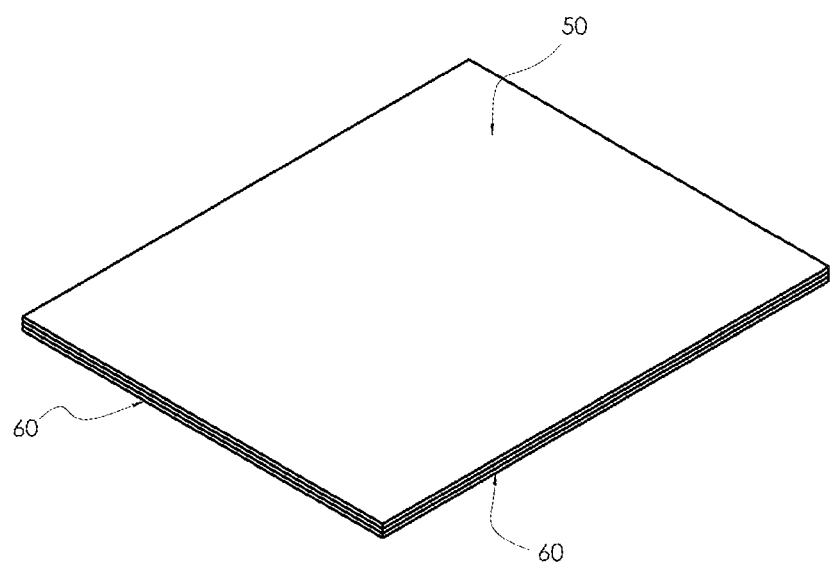
FIG. 5 is perspective view of a molecularly oriented planar sheets of material according to the preferred embodiment of the present invention.
Figure 6:
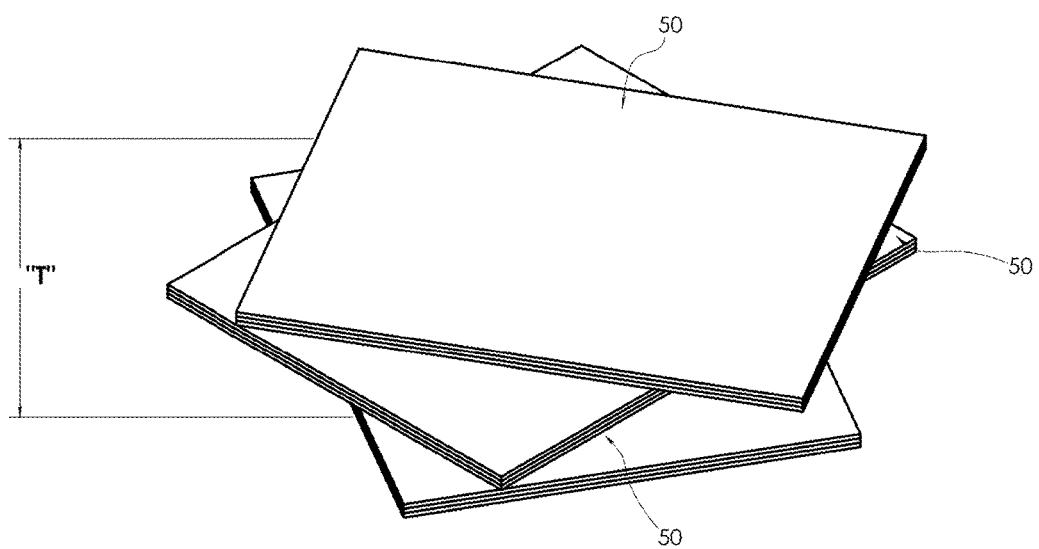
FIG. 6 is a perspective view of a lay-up of three planar sheets of the type shown in FIG. 5 oriented on a bias.

As shown in conjunction with FIG. 5, a similar or equivalent planar material 50 is formed as a sheet of molecularly oriented (generally 60) planar material. As shown further in conjunction with FIG. 6, the individual sheets 60 are then built up as numerous plies, each having the molecular orientation 60 oriented at an angle to the others while building a desired thickness "T" of material.

Similar to any plastics, PE/HDPE is an amorphous plastic having a nebulous, fluid-like non-crystalline molecular structure. Since PE is an amorphous material, it does not have a yield failure point like crystalline materials. As such, PE/HDPE is an elastic material that remains elastic throughout its elongation all the way up to the break point. Since it is an amorphous material, it is not subject to environmental stress cracking nor stress cracks when exposed to multi-axial stresses.

However, PE, HDPE or equivalent materials themselves are generally hard and rigid and lacks good elongation properties necessary for use as ballistic materials. In order to improve this characteristic and make the resultant product soft and pliable, mechanical modification of the orientation of the non-crystalline molecular structure is provided.

Figure 7:
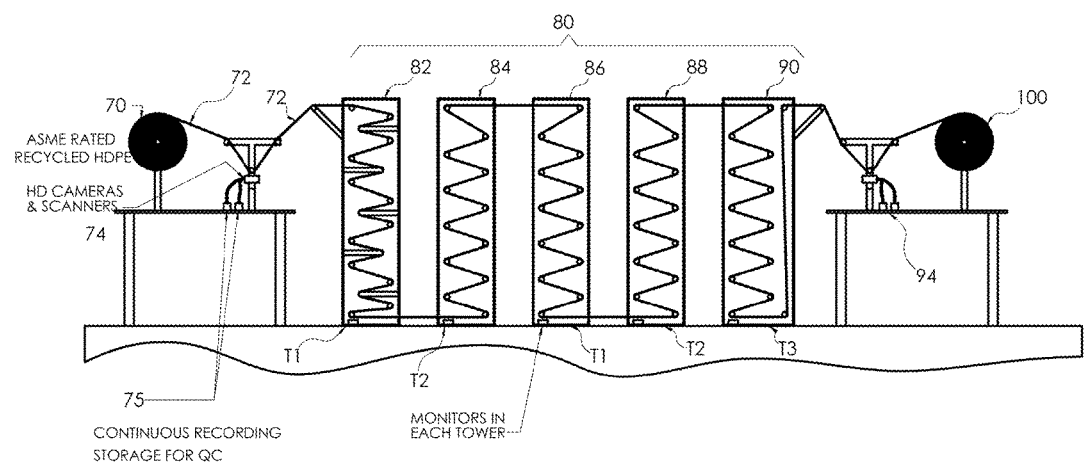
FIG. 7 is a schematic view of a process for and method of manufacture of a molecularly oriented planar sheet of material according to the preferred embodiment of the present invention.

Referring now in conjunction with FIG. 7, a schematic view of a process is generally shown for the manufacture of planar sheet of material according to and for use with the above described preferred embodiment of the present invention. The process is provided to molecularly orient an otherwise amorphous sheet of plastic material.

HDPE, or type 2 recycling plastics, are high-density polyethylene. These plastics make up the heavier containers that many of our everyday goods are stored in, and as such comprise a significant stream of recyclable post consumer waste. A person can look at the bottom of a type 2 plastic and see the number 2 surrounded by a triangle of arrows and the abbreviation HDPE underneath it. The types of containers that are embossed with this code include: milk containers; laundry detergent bottles; Tupperware® or similar food storage containers; bleach bottles; shampoo bottles; motor oil bottles; water bottles; and grocery bags. The first step in the recycling of these materials is to create standardized rolls of film of such recycled material. Such standard recycled HDPE film is commonly commercially available. A standard specification for polyethylene film and sheeting is described in ASTM standard D2103, and such rolls of recycled HDPE material are generally commercially available. As shown in use with the present process, such rolls 70 are provided in 1 meter (3.28 feet) wide rolls of material. It may become apparent to a person having ordinary skill in the relevant art, in light of the present teachings, that the use of film 72 formed of a virgin resin would still be economically and functionally effective for use in preparing anti-ballistic sheeting if processed accordingly. However, as should also then become apparent to a person having ordinary skill in the relevant art the use of a film 72 formed of recycled HDPE could provide additional benefits including, but not limited to, the ecological benefit of providing a high value added product utilizing a significant amount recycled post-consumer waste.

While the use of recycled HDPE film 72 as a feedstock provides numerous benefits, a concern with all uses of recycle materials is the effect of which impurities may have that are introduced into the material from the recycling homogenization of the post consumer waste stream. As such, the use of material quality testing 74 and recording of such test results may be desired or preferred in some instances. In the case of HDPE, and as shown in conjunction with the process of FIG. 7, impurities may result in variations in specific density and/or optical properties may be indicia of adverse quality events. As such, the use of optical, sonic or other conventional methods of identifying such variations may be used in a continuous manner.

Once spooled out, the film 72 may be oriented in a desired linear direction to allow a contiguous film sheet 76 to be subsequently processed. Additional processing is done through the application of staged thermal and mechanical gradients 80. As shown, each gradient stage is formed of incrementally increasing linear tension and an alternating heating cycle as described in greater detail below.

In a first stage 82, the film 78 is gradually heated to a first target temperature "T1" while being moved linearly under tension. In the instance where polyethylene is the processed material, a desired first target temperature "T1" is around approximately 192° F. (89° C.). Such a temperature is a well below the melting point of the material, but still provides a mechanical softening or increased mechanical ductility of the material sheet such as to allow the material to be mechanical stretch in the direction of pull and thereby provide an orientation force to the material at a molecular level. Subsequently, in a second stage 84, the film 78 is gradually cooled to a second target temperature "T2" while still being moved linearly under tension. In this same instance where polyethylene is the processed material, a desired second tarred temperature "T2" is around approximately 32° F. (0° C.). Such a temperature is sufficient to provide a mechanical hardening or increased mechanical rigidity of the material sheet such as to halt any mechanical stretching in the direction of pull.

It is an essential element of the present invention to provide for the orientation, at a molecular level, of the processed film sheet 78. It is further intended that such orientation be provided through the application of mechanical tension, during subsequent heating and cooling cycles, in order to "train" the processed film such that the polyethylene molecules thereby become oriented along the direction of draw or pull. To accomplish this, multiple stages of heating 82, 86, etc. and cooling 84, 88, etc. are provided in an alternating fashion. Once the desired level of processed molecular orientation is achieved, as final stage 90 is provided to bring the film 78 to room temperature.

Once processed, the 72 may be then re-spooled 100 as a processed material in a contiguous film sheet 79. The processed film 79 now has imparted into it an molecular orientation such as modified HDPE material that may subsequently be processed into bias oriented plies of materials that are built up to a desired thickness that has, preferably, a property of ballistic resistant materials according to a desired performance specification.

As described above, the use of recycled HDPE film 72 as a feedstock provides numerous benefits, but may be associated with impurities. As such, the use of a secondary material quality testing 94, and possible recording of such test results, may be desired or preferred in some instances.

As shown in conjunction with the Figures, interlineated layers of modified polyethylene materials are provided in which the modified HDPE material 50 is provided in sequential layers. As taught in the related art, between adjacent modified HDPE material layers 50 may be layers of carbon nanotubes. Carbon nanotubes have high strength, light weight and excellent energy absorption capacity and therefore have great potential applications in making anti-ballistic materials. The ballistic impact and bouncing-back on carbon nanotubes (or "CNT") with large radii withstand higher bullet speeds. Ballistic resistance is the highest when a bullet hits the center of the CNT. The ballistic resistance of CNTs will remain the same on subsequent bullet strikes if the impact is after a small time interval, i.e. the carbon nanotubes have the ability to "self heel" almost instantly after a multi axis impacts. Such a characteristic makes its use beneficial for repeated impacts to a finished ballistics sheet.

As further shown, between adjacent modified HDPE material layers 50 may be second layers (not shown) of magneto rheological fluids. Magneto-rheological fluids are liquids that change their properties when in the present of an applied magnetic. Made of very, very small iron particles mixed into a silicon oil or corn syrup, a solution having a mayonnaise-thick consistency is provided to produce just enough stiffness to prevent it from running between PE layers. These layers change their properties when in the presence of an applied magnetic field.

Finally, as should be understood in conjunction with the present and related prior teachings, the (composite) material herein formed herein, after laminated, may be further cured using heat to form a sheet or a three-dimensional shape for use in final product designs such as in helmets, shields, armor vest carrier inserts, or custom shapes as needed by the end user.

2. Operation of the Preferred Embodiment

In operation, the planar sheets of molecularly oriented plastic (such as HDPE) may be used for the further manufacture of an article of anti-ballistic shielding panels or anti-ballistic 3D molded articles. Utilizing the laminated composite material of the present invention, superior ballistic resistant properties are achieve. The resulting composite ballistic material have a very low cost-weight ratio. Further, the resulting composite ballistic material has a very low cost-strength ratio. Further still, the resulting ballistic material is manufactured without using fiber as the reinforcement.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A composite anti-ballistic material comprising:
  a first layer of modified polyethylene material;
  at least one second layer of modified polyethylene material; and
  at least a third layer of carbon nanotubes between said first layer and said at least one second layer;
  wherein each said modified polyethylene material comprises a molecularly oriented material and each said first layer is biased oriented relative to each said adjacent second layer.

2. The composite anti-ballistic material of claim 1, wherein said molecularly oriented material is oriented by providing mechanical tension during alternate cycling of heating and cooling of such modified polyethylene material.

3. The composite anti-ballistic material of claim 2, wherein said heating cycle comprises the heating of said modified polyethylene material to a point above a midpoint between a melting point and a freezing point.

4. The composite anti-ballistic material of claim 3, wherein said heating cycle comprises raising a temperature of the modified polyethylene material to approximately about 192° F.

5. The composite anti-ballistic material of claim 2, wherein said cooling cycle comprises the cooling of said modified polyethylene material to a temperature at or below a freezing point of said modified polyethylene material.

6. The composite anti-ballistic material of claim 5, wherein said temperature is approximately about 32° F.

7. The composite anti-ballistic material of claim 1, wherein said at least a third layer is at least approximately 1 mm in average thickness.

8. The composite anti-ballistic material of claim 1, further comprising at least a fourth layer of magneto rheological fluid between said first layer and said at least one second layer.

9. The composite anti-ballistic material of claim 1, further comprising at least a fourth layer of flame retardants between said first layer and said at least one second layer.

10. A composite anti-ballistic material comprising:
  a first layer of polyethylene materials modified having a common molecular orientation biased along a first direction;
  a second layer of polyethylene materials modified having a common molecular orientation biased along a first direction;
  said second layer of polyethylene materials modified having a common molecular orientation biased along a second direction;
  at least a third layer of carbon nanotubes between said first layer and second layer; and
  each said first layer being oriented relative to each said second layer such that said first direction is biased relative to said second direction.

11. The composite anti-ballistic material of claim 10, wherein said polyethylene materials are modified having a common molecular orientation biased by providing mechanical tension during alternate cycling of heating and cooling.

12. The composite anti-ballistic material of claim 11, wherein said heating cycle comprises a heating of said modified polyethylene material to a point above a midpoint between a melting point and a freezing point.

13. The composite anti-ballistic material of claim 11 wherein said heating cycle comprises raising a temperature of the modified polyethylene material to approximately about 192° F.

14. The composite anti-ballistic material of claim 11, wherein said cooling cycle comprises the cooling of said modified polyethylene material to a temperature at or below a freezing point of said modified polyethylene material.

15. The composite anti-ballistic material of claim 14, wherein said temperature is approximately about 32° F.

16. The composite anti-ballistic material of claim 10, wherein said at least a third layer is at least approximately 1 mm in average thickness.

17. The composite anti-ballistic material of claim 10, further comprising at a fourth layer of magneto rheological fluid between said first layer and said second layer.

18. The composite anti-ballistic material of claim 10, further comprising at least a fourth layer of flame retardants between said first layer and said second layer.

19. A composite anti-ballistic material comprising:
a plurality of adjacently positioned lamina and forming a desired thickness, each said lamina comprising:
a first layer of polyethylene material modified having a common molecular orientation biased along a first direction;
a second layer of polyethylene material modified having a common molecular orientation biased along a first direction;
said second layer of polyethylene material modified having a common molecular orientation biased along a second direction;
at least a third layer of carbon nanotubes between said first layer and second layer; and
each said first layer being oriented relative to each said second layer such that said first direction is biased relative to said second direction;
wherein adjacent lamina are further oriented at a bias relative to each other.

20. The composite anti-ballistic material of claim 19, wherein said polyethylene material of said first layer and said second layer are each modified having a common molecular orientation biased by providing mechanical tension during alternate cycling of heating and cooling.

21. The composite anti-ballistic material of claim 20, wherein said cycle of heating comprises a heating of said polyethylene material to a point above a midpoint between a melting point and a freezing point.

22. The composite anti-ballistic material of claim 20 wherein said cycle of heating comprises raising a temperature of said polyethylene material to approximately about 192° F.

23. The composite anti-ballistic material of claim 20, wherein said cycle of cooling comprises the cooling of said polyethylene material to a temperature at or below a freezing point of said polyethylene material.

24. The composite anti-ballistic material of claim 23, wherein said temperature is approximately about 32° F.

25. The composite anti-ballistic material of claim 19, wherein said at least a third layer is at least approximately 1 mm in average thickness.

26. The composite anti-ballistic material of claim 19, further comprising at a fourth layer of magneto rheological fluid between said first layer and said second layer.

27. The composite anti-ballistic material of claim 20, further comprising at least a fourth layer of flame retardants between said first layer and said second layer.

* * * * *